(12) United States Patent
Coccia et al.

(10) Patent No.: US 8,830,512 B2
(45) Date of Patent: Sep. 9, 2014

(54) SYSTEMS AND METHODS FOR DETECTING A LOCATION OF AN IMAGE FORMING DEVICE USING MOBILE DEVICE LOCALIZATION

(75) Inventors: Daniel A Coccia, Fairport, NY (US); Jason C Tsongas, Rochester, NY (US); Matthew O Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 68 days.

(21) Appl. No.: 13/552,676

(22) Filed: Jul. 19, 2012

(65) Prior Publication Data

US 2014/0022587 A1    Jan. 23, 2014

(51) Int. Cl.
*G06F 3/12* (2006.01)
*G06F 15/00* (2006.01)
*H04W 24/00* (2009.01)

(52) U.S. Cl.
USPC .................. 358/1.15; 358/1.9; 455/456.1

(58) Field of Classification Search
None
See application file for complete search history.

(56) References Cited

U.S. PATENT DOCUMENTS

2002/0055924 A1* 5/2002 Liming .......................... 707/100
2003/0011805 A1* 1/2003 Yacoub ......................... 358/1.15

OTHER PUBLICATIONS

Scrafford et al.; U.S. Appl. No. 13/194,228, filed Jul. 29, 2011; "Method and Apparatus for Determining Placement of Devices Based on a Building Layout".
Tsongas et al.; U.S. Appl. No. 13/541,421, filed Jul. 3, 2012, entitled "Systems and Methods for Employing Automated Data Analysis to Define Zones for Device Placement in an Operating Environment".

* cited by examiner

*Primary Examiner* — Thomas Lett
(74) *Attorney, Agent, or Firm* — Ronald E. Prass, Jr.; Prass LLP

(57) ABSTRACT

A system and method detect and localize image forming devices in an office environment by causing a mobile wireless device to send location information of the mobile wireless device to a central server system, which may be cloud-based and to which an image forming device is networked, upon executing an information retrieval request for establishing communication with the image forming device or when initiating an image forming operation, such as a print job, in the image forming device using the mobile wireless device. Mobile wireless device location information may be used as an aid in automatically plotting and/or updating a site location indication of each image forming device on a site map or in a central database. Location information may be employed to provide a user with a series of selectable options regarding a plurality of image forming devices in a vicinity of the mobile wireless device for use.

18 Claims, 7 Drawing Sheets

SYSTEMS AND METHODS FOR DETECTING A LOCATION OF AN IMAGE FORMING DEVICE USING MOBILE DEVICE LOCALIZATION

This application is related to U.S. patent application Ser. No. 13/194,228, filed Jul. 29, 2011, entitled "Method And Apparatus For Determining Placement Of Devices Based On A Building Layout," and to U.S. patent application Ser. No. 13/541,421, filed Jul. 3, 2012, entitled "Systems And Methods For Employing Automated Data Analysis To Define Zones For Device Placement In An Operating Environment," which are commonly assigned and the disclosures of which are hereby incorporated by reference herein in their entirety.

BACKGROUND

1. Field of Disclosed Subject Matter

This disclosure relates to systems and methods for detecting and localizing positions of output image forming devices in office workspace environments using location reference data from one or more mobile devices in wireless contact with the output image forming devices for image forming operations.

2. Related Art

Many mobile wireless devices include applications for communicating with output image forming devices to cause the output image forming devices to form hard-copy output images on image receiving media based on electronic data and/or instructions transmitted to the output image forming devices from the mobile wireless devices. These capabilities are being increasingly beneficially employed in modern office workspace environments to increase efficiency and productivity for individual users in carrying out assigned tasks that involve, for example, printing documents on available printing devices that may be individually accessed by the users via their mobile wireless devices. An ability to direct the printing of documents on an opportune printing device from a mobile wireless device, such as, for example, a smartphone or tablet device, frees individual users from being tied to their workspaces and specifically to a static workstation in the office workspace environment. Individual user workstations associated with individual users will no longer act as anchors to the individual users in optimizing their individual productivity. Additionally, users often access output image forming devices that are remote from their normal office workspace environment to conduct "mobile" image forming operations.

In order to gain maximum advantage in exploiting the described capabilities, users must be able to relatively easily establish communication between the mobile wireless device and any readily available output image forming device. A prerequisite to directing output image forming operations on a specific output image forming device based on commands and data sent from a mobile wireless device is the establishing of communications between the mobile wireless device and the output image forming device. When trying to print to a specific printer using a smartphone or tablet device, for example, the user must be either on a same wireless subnet as the printer, or must specifically enter an IP address of the printer for the location and to establish direct communication with the printer. In most scenarios, it is generally considered impractical that a mobile wireless device be on a same subnet because the large population of user wireless devices likely does not support required protocols.

SUMMARY OF THE DISCLOSED EMBODIMENTS

One manner by which the "essential" communications prerequisites has been addressed is by providing some manner of "machine readable code" on a particular output image forming device that can be scanned, for example, from a printer's local user interface by an application programmed into a user's mobile wireless device. The machine readable code may include, for transfer to users' mobile wireless devices, a set of instructions that will permit the mobile wireless devices to query, for example, a central server, which may be a cloud based resource, to retrieve all necessary information that may be required or appropriate to enable a particular user's mobile wireless device to print to the output image forming device.

The above scheme may be repeatedly undertaken in locations that include many output image forming devices, and may become confused in instances where locations of output image forming devices in an office workspace environment may be changed.

Most mobile wireless devices, such as smartphones and tablets, have an internal capability to localize their own geographic locations to a number of beneficial purposes and to support a full range of location-based applications. These geographic reference capabilities come in many forms including applications for geolocating the mobile wireless devices with reference to a Global Positioning Satellite (GPS) system, a cellular telephone communication system, a plurality of wireless access points, and the like.

It would be advantageous to exploit the localization capabilities of individual mobile wireless devices to further facilitate or streamline efficient workflows and processes in an office workspace environment in which mobile wireless devices are used to direct image forming operations in output image forming devices.

Exemplary embodiments of the systems and methods according to this disclosure may cause a user's mobile wireless device to send location information regarding an actual position of the user's mobile wireless device to a central server system, which may be cloud based, to which an output image forming device is networked upon executing an information retrieval request for establishing communications with the output image forming device.

Exemplary embodiments may cause the user's mobile wireless device to pass current location information for the user's mobile wireless device to the central server, or other data storage device, in a networked system, when an image forming operation, such as a print job, is sent to a specific output image forming device, such as a specific printer.

Exemplary embodiments may use the mobile wireless device location information as an aid in automatically plotting and/or updating a site location indication of each printer on, for example, a site map, or in, for example, a central database. In this regard, the disclosed systems and methods may catalogue individual locations for a plurality of mobile wireless devices communicating with a particular output image forming device and analyze the location data to localize a position of the particular output image forming device.

Exemplary embodiments may assimilate location information to maintain and update a current indication of locations of all output image forming devices within a site, such as an office workspace environment. This intelligence may provide for automatically learning a position of the output image forming device during a run time of a printing application directed by one or more mobile wireless devices to one or more output image forming devices. This data collection and analysis may preclude a separate administrative requirement to maintain a current indication of individual locations for an entire fleet of output image forming devices by other means.

Exemplary embodiments may employ location information provided by a user's mobile wireless device to provide that user with a series of selectable options regarding a plurality of output image forming devices in a vicinity of the location of the user's mobile wireless device that may be preferably referenced by the user, in selecting for execution of a print job, a particular output image forming operation based on proximity to the user and/or capabilities of the particular output image forming device.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for detecting and localizing output image forming devices in an office workspace environment using location reference data from one or more mobile devices in wireless contact with the output image forming devices for image forming operations will be described, in detail, with reference to the following drawings, in which.

DETAILED DESCRIPTION OF THE DISCLOSED EMBODIMENTS

Figure 1:
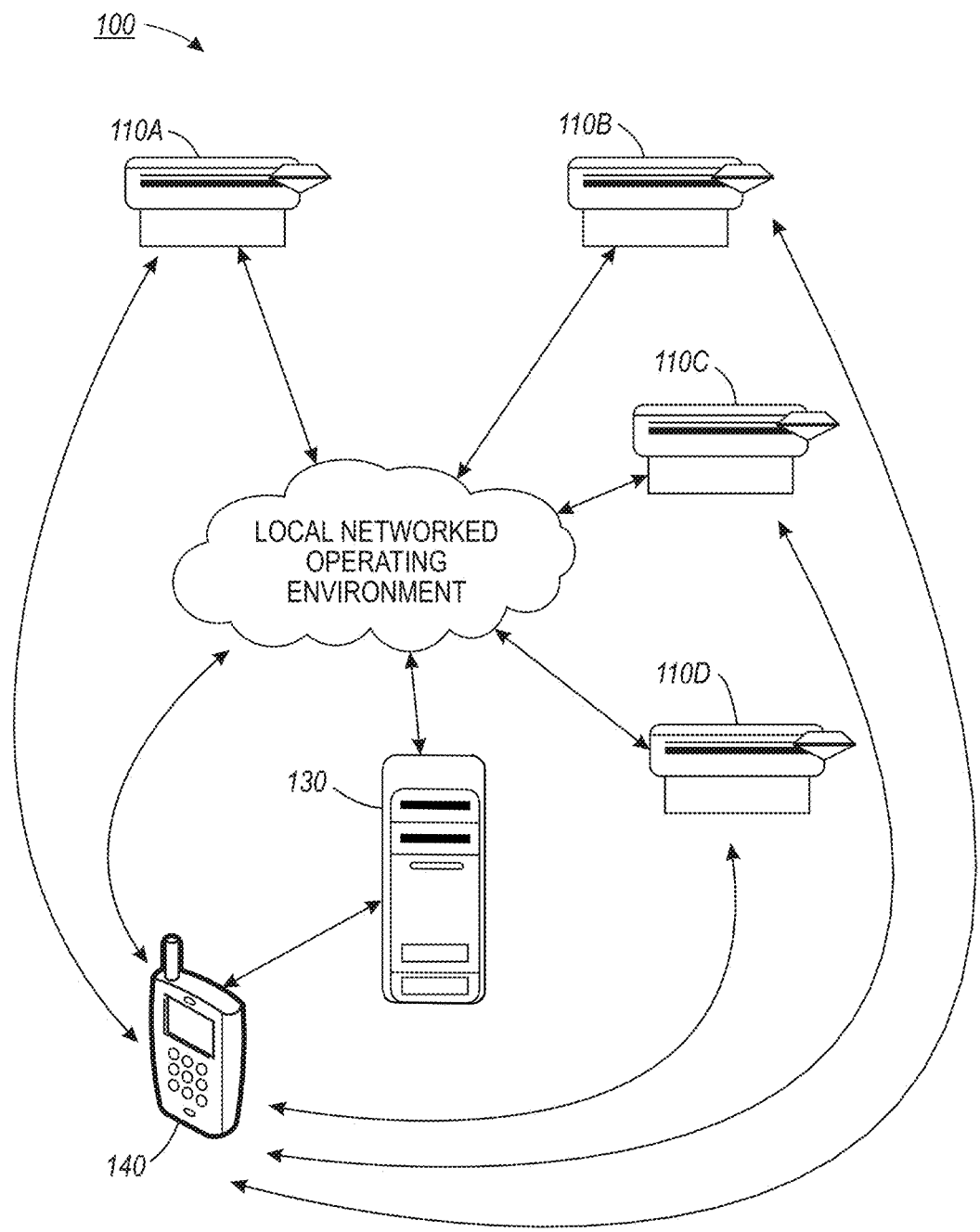
FIG. 1 illustrates an exemplary overview of a local networked operating environment supporting a number of output image forming devices with which a mobile wireless device may establish communications with the systems and methods according to this disclosure.

The systems and methods for detecting and localizing output image forming devices in an office workspace environment using location reference data from one or more mobile devices in wireless contact with the output image forming devices for image forming operations in this disclosure will generally refer to this specific utility or function for those systems and methods. Exemplary embodiments described and depicted in this disclosure should not be interpreted as being specifically limited to any particular configuration of the described elements, any specific program applications, or any limiting configuration of a networked communicating environment, or as being specifically limited to any particular intended use. Any advantageous combination of the disclosed features, which may employ a location information from a plurality of mobile wireless devices in communication with a potentially movable device to localize a position of the potentially movable device, or otherwise may benefit from employing the described detection and localization scheme are contemplated as being included in this disclosure.

Specific reference to, for example, an output image forming device as that term is commonly used throughout this disclosure is intended to make non-limiting reference to common electronic and image forming devices, including printers and copy machines with a printing capability in a networked workspace operating environment as examples. These devices are those to which a plurality of users may forward work product from mobile wireless devices, either directly, of via a wired or wireless network component or components with which mobile wireless devices may communicate in order that the work product is output locally in hard copy. These terms should not be considered as limiting to any particular configuration of those respective devices, as described. The terms "output image forming device," and the like, as referenced throughout this disclosure are intended to refer globally to a class of devices and systems that carry out what are generally understood as printing and image forming functions as those functions would be familiar to those of skill in the art.

Specific reference to, for example, any particular mobile wireless device operated by a user should also be understood as being exemplary only, and not limited, in any manner, to any particular class of devices. The systems and methods according to this disclosure will be described as being particularly adaptable to being hosted on commercially-available hand-held wireless devices such as smartphones, laptop or tablet computers, personal digital assistants (PDAs) and the like, but should not be considered as being limited to only these devices. The term "mobile wireless device" will be generically used throughout this disclosure to describe these devices in a non-limiting manner.

As is discussed above, output image forming devices deployed in an office workspace environment may be moved randomly or fairly regularly to new locations. This is even the case with larger composite image forming systems, particularly as employment of a particular space within the office workspace environment may change or workflow within a particular workspace may change. Difficulties arise for users, customers and vendors, the latter that may be administering a management contract for the servicing the devices, in keeping track of where individual output image forming devices are located at any given time. Initial placement of the output image forming devices by the vendor, for example, may provide no indication as to later placement of the output image forming devices. In an office workspace environment, a vendor particularly, but others as well, may be precluded from walking around the area to attempt to determine where a particular output image forming device has been relocated.

Applications, such as mobile print applications, exist by which local communication between a user's mobile wireless device and an output image forming device may be established to direct image forming operations in the output image forming device based on instructions and/or data transmitted by the mobile wireless device. Commonly, a user will employ an output image forming device that is in close proximity to the user at the time the user initiates the image forming operation with the user's mobile wireless device. As such, it can be generally assumed that print operations, which may be initiated by a plurality of user mobile wireless devices to be carried out by a particular output image forming device, are based on the plurality of user mobile wireless devices being in reasonably close proximity to the output image forming device at the time the image forming operation is initiated. There, of course, may be outliers, but the analysis scheme can account for those based on a review of the entire mobile user population initiating image forming operations in a particular output image forming device using mobile wireless devices. The more that users initiate image forming operations on a particular output image forming device, the higher the fidelity of the localization will be. The location for the output image forming device may thus be resolved based on usage by mobile users.

A user's preference for employing an output image forming device in close proximity to the user's location becomes particularly acute when one considers that a typical means for initiating a process by which the user's wireless device may communicate with a particular output image forming device may include reading a machine readable code, which may be presented in the form of a barcode, a glyph, or a like machine readable image that can be scanned by the user's mobile wireless device from an actual physical label on the particular output image forming device, or from an image presented on a graphical user interface for the particular output image forming device. The machine readable code, as discussed briefly above, may include a set of instructions that will allow the user's mobile wireless device to acquire enough contact information to wirelessly query the particular output image forming device itself, or one or more network data storage elements with which the particular output image forming device is in communication, to retrieve all information that may be required or appropriate for the user's mobile wireless device to establish or enhance its communication with the particular output image forming device in order to make the particular output image forming device ready and able to execute an image forming operation initiated by the user via the user's mobile wireless device.

Mobile device (print) applications may thus be used to establish a location of an output image forming device.

FIG. 1 illustrates an exemplary overview 100 of a local networked operating environment 120 supporting a number of output image forming devices 110A-D with which a user's mobile wireless device 140 may establish communications according to the systems and methods of this disclosure. As shown in FIG. 1, and as is commonly understood, the exemplary local networked operating environment 120 may include any combination of devices including a plurality of user workstations (not shown) of various types coupled to, or in direct or networked communication with, one or more servers 130. Individual components of the exemplary local networked operating environment 120 may be individually connected to each other, or otherwise in communication with each other via some sort of central mainframe, by combinations of wired and wireless communications between individual elements.

A user's mobile wireless device 140 may be provided to communicate with the exemplary local networked operating environment 120 via one or more wireless access points. The user's mobile wireless device 140 may be configured with at least one application by which image forming operations are directed in one or more of the output image forming devices 110A-D. It is based on this ability of such an exemplary user's mobile wireless device 140 to communicate directly, or via a network, with the one or more output image forming devices to initiate and undertake image forming operations that forms the backbone for the described detection and localization schemes.

The user's mobile wireless device 140, as will be discussed in greater detail below, may include at least one application by which the user's mobile wireless device 140 can geolocate itself. This at least one application may make use of communications by the user's mobile wireless device 140 with at least one of a Global Positioning Satellite (GPS) system, a cellular telephone communications network, and a plurality of wireless access points to constantly or periodically update an actual geographic location of the user's mobile wireless device 140.

It should be noted that each of the wired and wireless data communications lines between the various components shown in FIG. 1 are unnumbered because one of ordinary skill in the art will recognize that such internal communications could be displayed and/or depicted in a virtually a limitless combination of connections between individual components and devices attached to the exemplary local networked operating environment 120 shown in FIG. 1.

Figure 2:
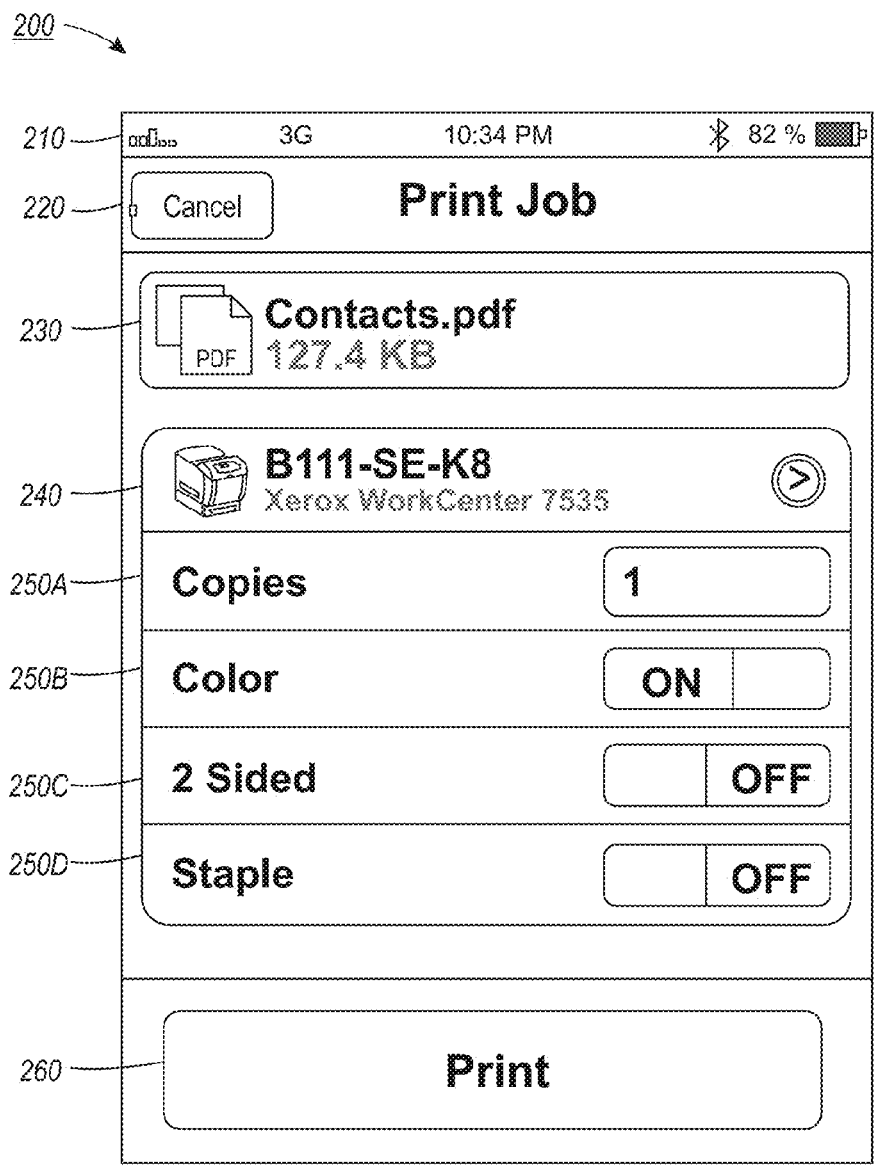
FIG. 2 illustrates an exemplary embodiment of a display for an image forming application on in a mobile wireless device that may be usable to instruct image forming operations with the systems and methods according to this disclosure.

FIG. 2 illustrates an exemplary embodiment of display 200 for an image forming application on a mobile wireless device that may be usable to instruct image forming operations with the systems and methods according to this disclosure. As shown in FIG. 2, the exemplary embodiment of the display 200 may maintain certain information in an administrative display segment or field 210 associated with generic operation of the mobile wireless device.

Additional interactive fields may be included in a touchscreen matrix by which a print application selection 220, with an option for cancellation, may be included.

The exemplary embodiment of the display 200 may include a document selection field 230 by which a user can identify one or more data files that are to be forwarded to the output image forming device to be printed as output hardcopy images on an image receiving substrate.

A printer display field 240 may be included to indicate which of a plurality of available output image forming devices (printers) is selected with which the mobile wireless device is communicating to undertake the image forming operations.

Additional print command fields 240A-D may be included by which a user may select details of the image forming operation to be conducted with the identified output image forming device. The image forming application, a display of which is shown in exemplary manner in FIG. 2, should provide a user with much of the functionality that would be afforded the user (1) if directly operating the output image forming device via, for example, a graphical user interface associated with the output image forming device, or (2) if operating the output image forming device from a networked digital user workstation in wired or wireless communication with the output image forming device directly or via the network.

It should be understood that the depiction in FIG. 2 is meant to be a non-limiting example of a combination of fields and functions that may be available to the user of the mobile wireless device in an application for executing image forming operations with at least one output image forming device using the mobile wireless device to initiate and direct the image forming operations.

Figure 3:
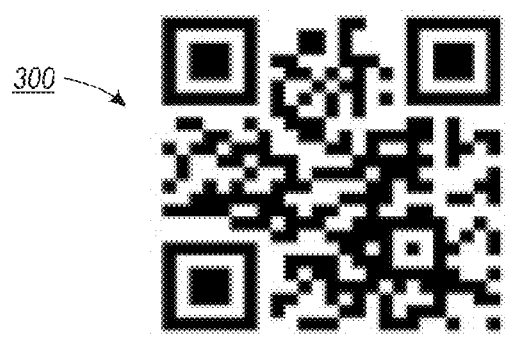
FIG. 3 illustrates an exemplary embodiment of a machine readable mark that may be usable to aid in establishing communication between a mobile wireless device and an output image forming device with which the machine readable mark is associated to facilitate printing operations, and detecting and localizing operations according to the systems and methods according of this disclosure.

FIG. 3 illustrates an exemplary embodiment of a machine readable mark 300 that may be usable to aid in establishing communication between a mobile wireless device and an output image forming device with which the machine readable mark is associated to facilitate printing operations, and detecting and localizing operations according to the systems and methods of this disclosure, as discussed in more detail above. Many mobile wireless device print applications allow a user to enter specifics about a particular output image forming device to populate the fields shown in FIG. 2. Alternatively, the mobile wireless device print application may allow for the machine readable mark displayed on the output image forming device to be scanned by the mobile wireless device to auto populate the fields in the mobile wireless device print application with the output image forming device information. Given that most mobile wireless devices are "location aware," a particular mobile wireless device may capture its location when the machine readable mark 300 is read and transmit that information to a central server, which may be located on the network or may be cloud-based. Since the user would generally need to be at the device to scan the machine readable mark 300, the assumption would be that the location of the device is fairly accurately localized based on a "known" location of the mobile wireless device at the time the machine readable mark 300 in scanned.

Figure 4:
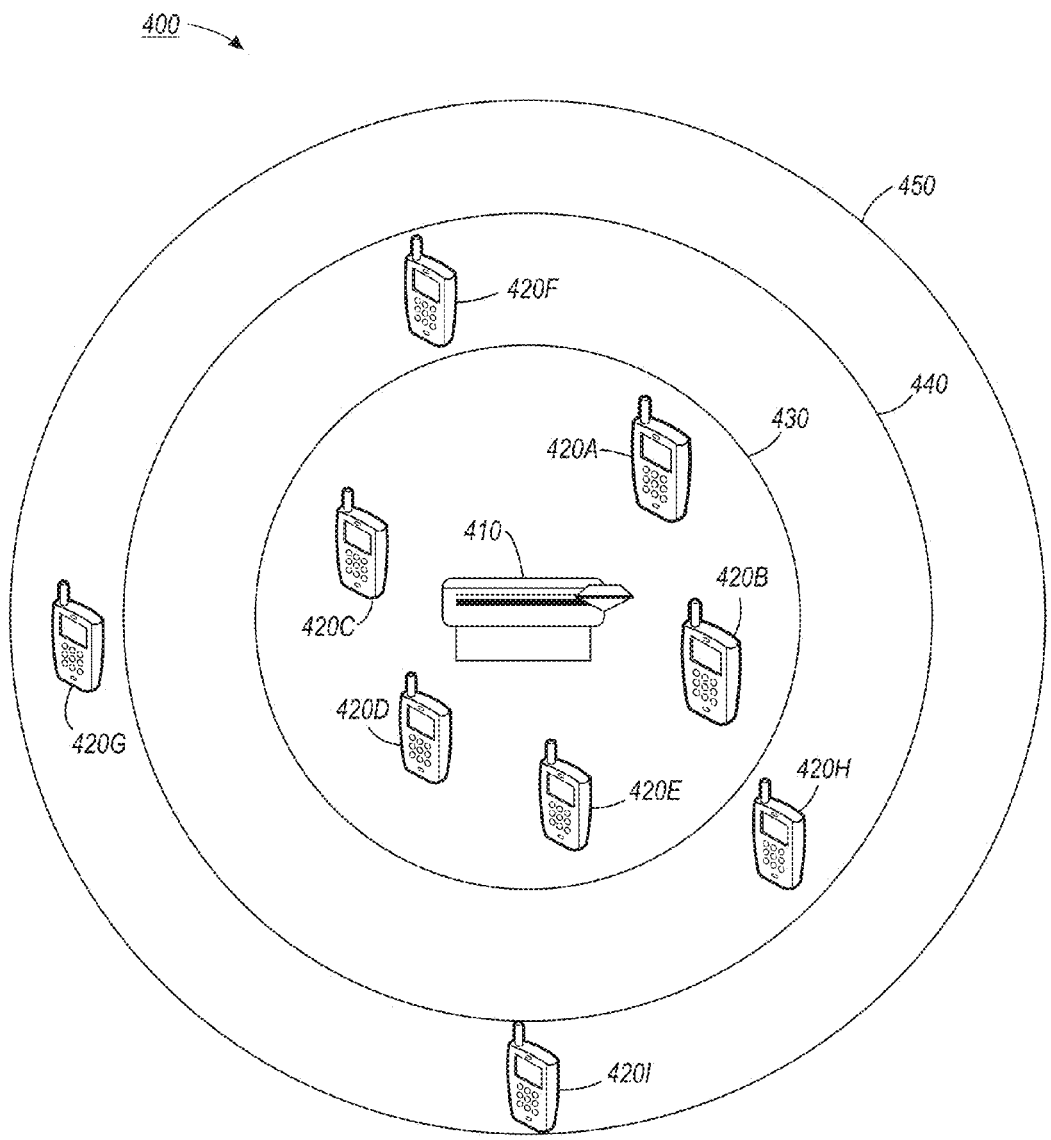
FIG. 4. illustrates an exemplary overview of a user environment from which information may be gathered to support a detection and localization scheme for an output image forming device according to the systems and methods of this disclosure.

FIG. 4. illustrates an exemplary overview of a user environment 400 from which information may be gathered to support a detection and localization scheme for an output image forming device according to the systems and methods of this disclosure. As shown in FIG. 4, an output image forming device 410 may communicate with a plurality of individual mobile wireless devices 420A-I, each of which may execute an application for directing an image forming operation in the output image forming device 410. Each time that one of the individual mobile wireless devices 420A-I initiates a command for an image forming operation to be carried out in the output image forming device 410, a location of the one of the individual mobile wireless devices 420A-I may be transmitted to a central server or to the cloud. Location of all mobile wireless devices 420A-I printing to the output image forming device 410 may be captured for further analysis via an analysis component that may be resident, for example, in the central server or in the cloud. The more users employing mobile wireless device print applications, the larger the amount of available information on individual mobile wireless device locations and the easier it may be to determine a location for the output image forming device 410. Certain threshold distances 430-450 may be established and programmed into a database storage portion in the central server or cloud to determine an area where most of the image forming operations are being initiated by individual mobile wireless devices 420A-E, for example. Locations of individual mobile wireless devices 420E-I lying outside these relative threshold distances 430-450 from the output image forming device 410 may be recorded and used to aid in the localization process, albeit that the disclosed systems and methods may recognize these as outlier positions and analyze their relative importance to the localization process as low.

The depicted laydown will likely change with movement of the output image forming device 410 from its current location amidst frequent user mobile wireless devices 420A-E to a new location where information from another set of frequent user mobile wireless devices may be used to re-localize the new position of the output image forming device 410. In this regard, even though a position of a particular output image forming device 410 may be resolved at a particular point in time, once that device is moved away from a current user mobile wireless device population, when a new user wireless mobile device population begins to use the output image forming device 410, its new location may be easily resolved. It is recognized that certain of the mobile wireless devices 420A-E may continue to use the output image forming device 410 for some period of time because those mobile wireless devices 420A-E had previously established communication with the output image forming device 410 and may not have, for example, selected a new output image forming device that may be more convenient to a particular location of many or all of mobile wireless devices 420A-E, once the output image forming device 410 is moved. Information regarding the use of certain outlier mobile wireless devices may, over time, be discounted based on analysis of the entire user population that will localize the new position of the particular device in its new location.

The nature of the image forming operations described above, and the ultimate convenience that individual users may seek to avail themselves of, generally causes individual users to initiate image forming operations from their mobile wireless devices on output image forming devices that are located proximate to them at the time that they initiate the image forming operations. These characteristics of use provide information regarding the location of the output image forming device as use of the output image forming device by a particular population of users in a specified location decreases commensurate with an increase in use of the output image forming device for another population of users in a different specified location. Usage will tend to decrease for the population of users based on the inconvenience of the output image forming device not being located proximately to them when the output image forming device is moved.

An additional item of information that may be used in the localization analysis is the elapsed time since the location information was stored in a central server or in the cloud. As location information for the location at which a user's mobile wireless device scanned a machine readable code ages, values of more recent locations at which print operations are initiated by a particular population of "connected" mobile wireless devices will increase. It is the more current or timely user mobile wireless device information that will be more germane to localizing the output image forming device based on the collected data.

Once the initial output image forming device laydown for a particular site is established, the disclosed schemes provide a method for dynamically updating that laydown. Localization of the fleet of output image forming devices will aid the customer in inventory control over its devices and vendor representatives in quickly locating a particular output image forming device when, for example, repair or replacement is required. These are just a few of the many benefits that may be provided by the disclosed detection and localization scheme.

The disclosed schemes, whether partially or fully implemented, may provide a novel capacity by which customers may overcome current struggles with tracking output image forming device locations throughout their facilities. The disclosed schemes may also assist customers when adding devices. Manual updates of current and projected device maps, for example, are very time consuming, often requiring weeks for larger corporations to complete. The manual process is hindered by movement of devices that may occur even before an overall inventory is complete. As devices are moved, the manual approach may yield incorrect information. The automation and accuracy provided by the disclosed schemes, allowing for constant updates based on the very latest user information, may significantly obviate the shortfalls incumbent in the manual approach. The activity of actual real time users is employed to determine an actual real time location of a particular output image forming device, thereby offering greater accessibility to users of mobile wireless device printing applications.

Additionally, with a database of location information gathered, an option could be offered in the mobile wireless device print application to allow the user to print to a nearby device without any actual address information being known.

Figure 5:
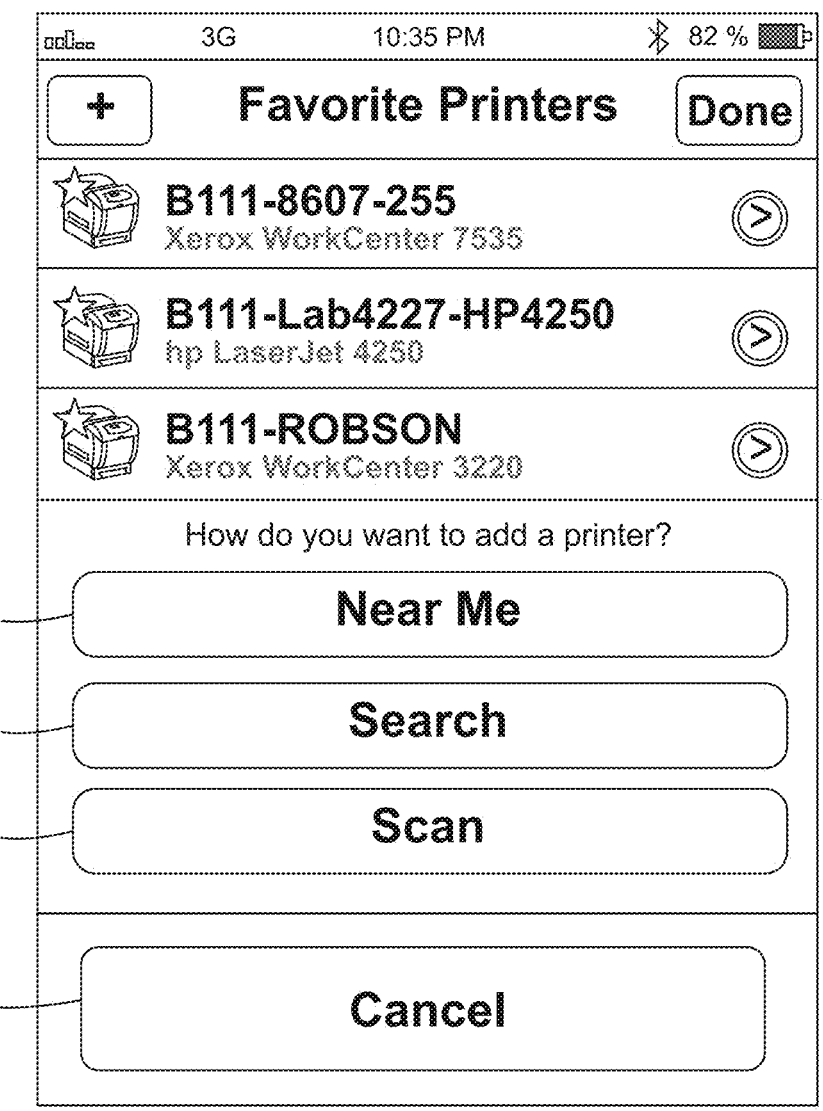
FIG. 5 illustrates a first exemplary display for an application in a mobile wireless device that may advantageously employ location information for a plurality of output image forming devices developed using the systems and methods according to this disclosure.

FIG. 5 illustrates a first exemplary display 500 for an application in a mobile wireless device that may advantageously employ location information for a plurality of output image forming devices developed using the systems and methods according to this disclosure. Given a current location of a user's wireless mobile device, the application may provide the user of the mobile wireless device a set of options 510-540 by which to query a database of currently "known" locations for one or more output image forming device to find those in relative proximity to the user's mobile wireless device and to offer those output image forming devices as options for use in executing the image forming operations from the user's mobile wireless device.

The "Near Me" option 510, for example, may allow for the system to indicate which output image forming devices may be located proximate to the user's mobile wireless device without any other information on a predefined list of what output image forming devices are located nearby. The application may be able to establish, based on communication with, for example, a central server, and the data stored therein, or via other means, a subset of available output image forming devices that may be located "near" the mobile wireless device.

Figure 6:
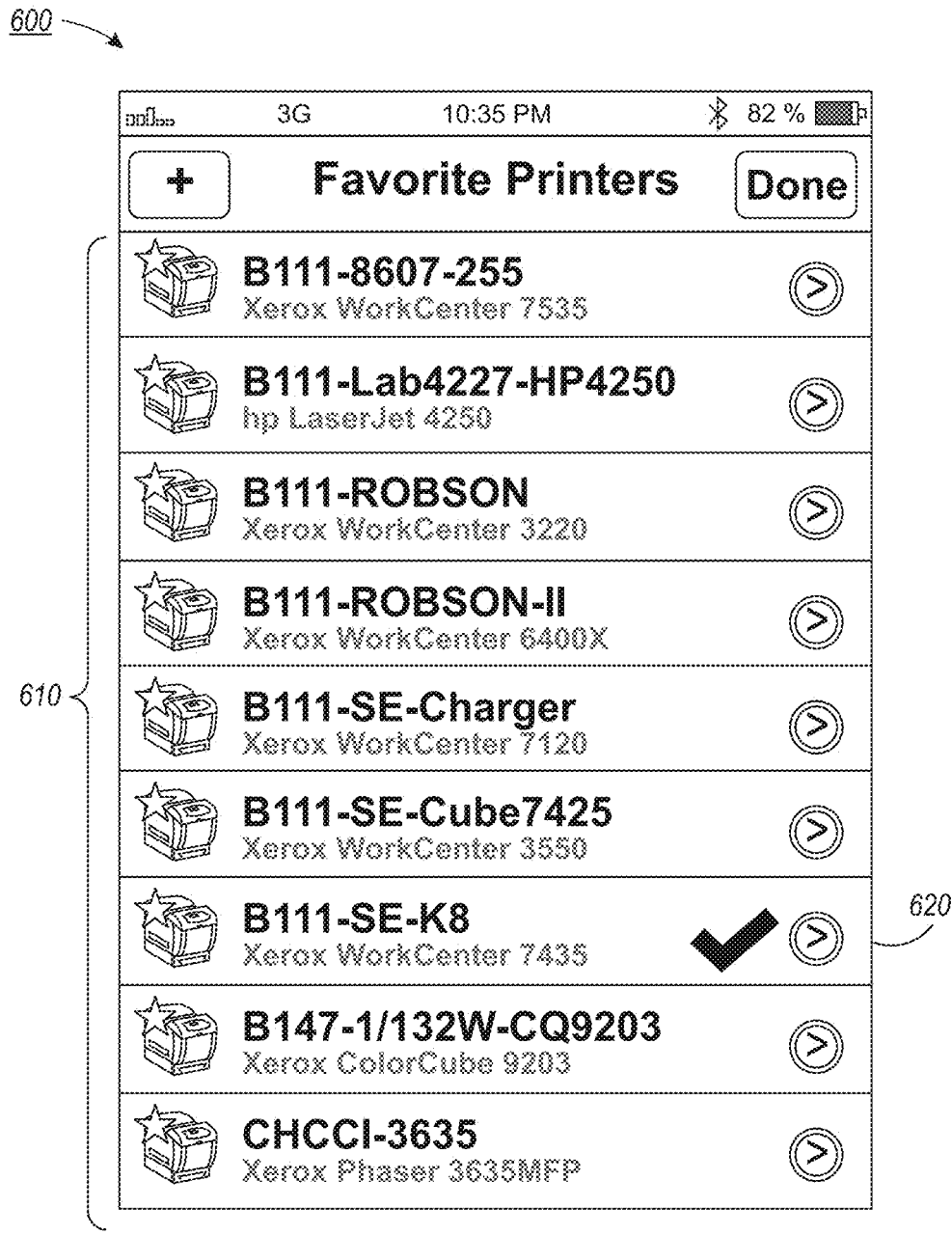
FIG. 6 illustrates a second exemplary display for an application in a mobile wireless device that may advantageously employ location information for a plurality of output image forming devices developed using the systems and methods according to this disclosure.

FIG. 6 illustrates a second exemplary display 600 for an application in a mobile wireless device that may advantageously employ location information for a plurality of output image forming devices developed using the systems and methods according to this disclosure. A result of the query initiated using a display such as that shown in FIG. 5 associated with a mobile wireless device print application may yield a list 610 available and proximate output image forming device allowing a user to select a particular device 620 for use. In this manner, the user may then have option such as printing a test document or printing their document to the selected output image forming device, or choosing another output image forming device for their image forming operation device to print their job.

Executing an application such as that described above with regard to FIG. 5, may result in a prioritized list of available output image forming devices located in relative close proximity to the user's mobile wireless device being presented to the user in the manner shown in FIG. 6. The user may then select which of a particular set of output image forming devices the user may wish to establish contact with using the user's mobile wireless device. The selection may be based on proximity to and/or capabilities of a particular output image forming device based on the information presented on the user's mobile wireless device executing the application. The presumption is that the individually-displayed options for individual output image forming devices will be located proximate to a position of the user's mobile wireless device. A threshold for an approximate range between the user's mobile wireless device and a particular output image forming device may be set by user. In embodiments, the application may ultimately be able to provide a user with a direction and distance from the location of the user's mobile wireless device to the particularly selected output image forming device.

Figure 7:
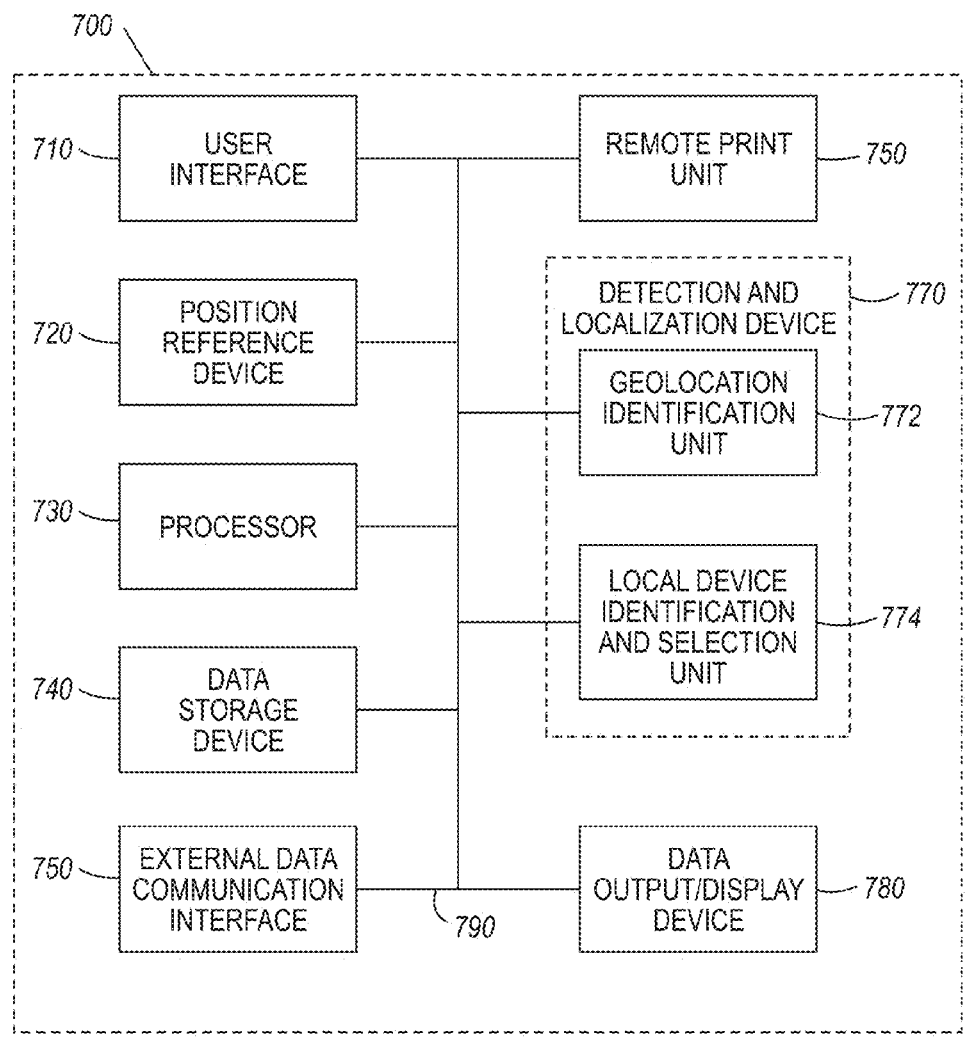
FIG. 7 illustrates a block diagram of an exemplary mobile wireless device for implementing a detection and localization scheme for one or more output image forming devices in an office workspace environment using location reference data from the mobile wireless device according to this disclosure.

FIG. 7 illustrates a block diagram of an exemplary mobile wireless device 700 for implementing a detection and localization scheme for one or more output image forming devices in an office workspace environment using location reference data from the mobile wireless device according to this disclosure. The components of exemplary mobile wireless device 700 shown in FIG. 7 may be embodied in, for example, the smartphone, tablet or other like mobile wireless device. Otherwise, data storage and analysis elements depicted as being portions of the exemplary mobile wireless device 700 shown in FIG. 7 may be housed in a remote location, such as remote server or the cloud with which the exemplary mobile wireless device 700 may be in electronic data communication. An objective of the systems and methods according to this disclosure, however, is to house the data acquisition and localization functions, to the greatest extent, locally in the exemplary mobile wireless device 700. This objective supports a goal of providing discrete detection and localization using the autonomous systems of the exemplary mobile wireless device 700 while certain storage and analysis functions may be off-loaded to network-connected components.

The exemplary mobile wireless device 700 may include a user interface 710 by which the user may communicate with the exemplary mobile wireless device 700. The user interface 710 may be configured as one or more conventional mechanisms common to mobile wireless devices such as those listed above. The user interface 710 may permit a user to input information to the exemplary mobile wireless device 700 in order to, for example, to activate a mobile wireless device printing application, and a detection and localization scheme according to this disclosure. An objective of such activation would be to present the user with a series of interactive displays by which the user may manipulate the print function, and simultaneously direct transmission of a location of the mobile wireless device to a central server or the cloud. The user interface 710 may include, for example, an integral keyboard, a touchscreen with "soft" buttons, various components for use with a compatible stylus, a microphone by which a user may provide oral commands to the exemplary mobile wireless device 700 to be "translated" by a voice recognition program or otherwise, or other like device for user activation of, and communication with the detection and localization scheme components embodied in the exemplary mobile wireless device 700.

The exemplary mobile wireless device 700 may include one or more position reference devices 720. Such position reference devices 720 may comprise a GPS receiver for receiving global positioning satellite location information to the exemplary mobile wireless device 700, and/or may include an inertial navigation system or other like device that can localize the position of the system for use. Information regarding a position of the exemplary mobile wireless device 700 may be alternatively discerned with reference to positioning in a cellular telephone network communication system or with reference to a number of wireless access points with which the exemplary mobile wireless device 700 may be in communication. The ability to geolocate itself is instrumental to the disclosed schemes for using the exemplary mobile wireless device 700 for detecting and localizing positions of the output image forming devices according to the disclosed methods.

The exemplary mobile wireless device 700 may include one or more local processors 730 for individually operating the exemplary mobile wireless device 700 and carrying out the mobile printing applications, the position reference methods, and the described output image forming device detecting and localizing schemes. Processor(s) 730 may include at least one conventional processor or microprocessor that interprets and executes instructions to direct specific applications and functions with regard to particular output image forming devices. Processor(s) 730 may initiate and control the data collection and analysis efforts of the exemplary mobile wireless device 700 once those efforts are initiated by, for example, manual input by a user via the user interface 710. It should also be understood that the processor(s) 730 may control only the printing and location identification processes, while analysis of provided location information associated with implementation of image forming operations in an output image forming device may be separately undertaken in communication with, for example, a central server or the cloud.

The exemplary mobile wireless device 700 may include one or more data storage devices 740. Such data storage device(s) 740 may be used to store data or operating programs to be used by the exemplary mobile wireless device 700, and specifically the processor(s) 730. Data storage device(s) 740 may be used to collect and store printing applications and instructions based on communication with one or more output image forming devices, and to collect and store location information for beneficial use according to the described detection and localization schemes.

Data storage device(s) 740 may include a random access memory (RAM) or another type of dynamic storage device that is capable of storing collected information, and separately storing instructions for execution of system operations by, for example, processor(s) 730. Data storage device(s) 740 may also include a read-only memory (ROM), which may include a conventional ROM device or another type of static storage device that stores static information and instructions for processor(s) 730. Further, the data storage device(s) 740 may be integral to the exemplary mobile wireless device 700, or may be provided external to, and in wireless communication with, the exemplary mobile wireless device 700.

The exemplary mobile wireless device 700 may include one or more external data communication interfaces 750 by which the exemplary mobile wireless device 700 may communicate with components external to the exemplary mobile wireless device 700, such as the output image forming devices to which the exemplary mobile wireless device 700 directs printing operations or the central server or cloud to which the exemplary mobile wireless device 700 directs location data. The one or more external data communication interfaces 750 may be specifically configured, as appropriate to communicate with individual output image forming devices, a local network operating environment, a GPS system, a cellular telephone communication network, a plurality of wireless access points, or the like.

The exemplary mobile wireless device 700 may include a remote print unit 760 which may be used to execute, autonomously or in combination with the processor 730 and the one or more data storage devices 740, a mobile wireless device print application. The remote print unit 760 may interpret information provided by a scanned machine readable mark to establish communication with at least one output image forming device to which the remote print unit 760 may direct data and instructions for performing an image forming operation directed by the exemplary mobile wireless device 700.

The exemplary mobile wireless device 700 may include a specific detection and localization device 770 as a part of a processor 730 coupled to, for example, one or more storage devices 740, or as a separate component module or circuit in the exemplary mobile wireless device 700. The detection and localization device 770 may include at least a geolocation identification unit 772 and local device identification and selection unit 774. As with all of the components of the exemplary mobile wireless device 700, the detection and localization device 770, with its geolocation identification unit 772 and local device identification and selection unit 774, is preferably housed locally in the exemplary mobile wireless device 700, but portions of detection and localization device 770 may be housed on a central server or in the cloud. In this manner, specific data collection may be undertaken locally under control of, for example, one or more processor(s) 730 in the exemplary mobile wireless device 700, while analysis functions may occur at a remote location where, for example, location data collected from the exemplary mobile wireless device 700, when it reads the machine readable mark associated with the output image forming device, or when it directs an image forming operation in the output image forming device, may be analyzed in more detail manner. As indicated above, a specific objective of the systems and methods according to this disclosure remains, however, to house all of the data collection and localization components within the exemplary mobile wireless device 700, while assessment and analysis functions may be remotely undertaken to include remote storage of a database with location information for a plurality of output image forming devices.

The geolocation identification unit 772 may be provided to integrate with the position reference device 720 to provide a geographic location of the exemplary mobile wireless device 700 when collecting information from an output image forming device regarding establishing communications with the output image forming device, or when initiating an image forming operation to be carried out by the output image forming device.

The location device identification and selection unit 774 may be provided to query a stored database to determine which of a plurality of available output image forming devices in a particular location may be most proximate, or near, the exemplary mobile wireless device 700 in order that the mobile wireless device print application may execute an image forming operation in an output image forming device that is most convenient to a user of the exemplary mobile wireless device 700 at a particular time.

The exemplary mobile wireless device 700 may include at least one data output/display device 780 which may be configured as one or more conventional mechanisms that output information to the user, including a display screen on the mobile wireless device 700.

All of the various components of the exemplary mobile wireless device 700, as depicted in FIG. 7, may be connected by one or more data/control busses 790. These data/control bus(ses) 790 may provide wired or wireless communication between the various components of the exemplary mobile wireless device 700, whether all of those components are housed integrally in, or are otherwise external and connected to, the exemplary mobile wireless device 700.

It should be appreciated that, although depicted in FIG. 7 as an integral unit, the various disclosed elements of the exemplary mobile wireless device 700 may be arranged in any combination of sub-systems as individual components or combinations of components, integral to a single unit, or external to, and in wired or wireless communication with the single unit of the exemplary mobile wireless device 700. In other words, no specific configuration as an integral unit or as a support unit is to be implied by the depiction in FIG. 7. Further, although depicted as individual units for ease of understanding of the details provided in this disclosure regarding the exemplary mobile wireless device 700, it should be understood that the described functions of any of the individually-depicted components may be undertaken, for example, by one or more processors 730 connected to, and in communication with, one or more data storage devices 740.

Figure 8:
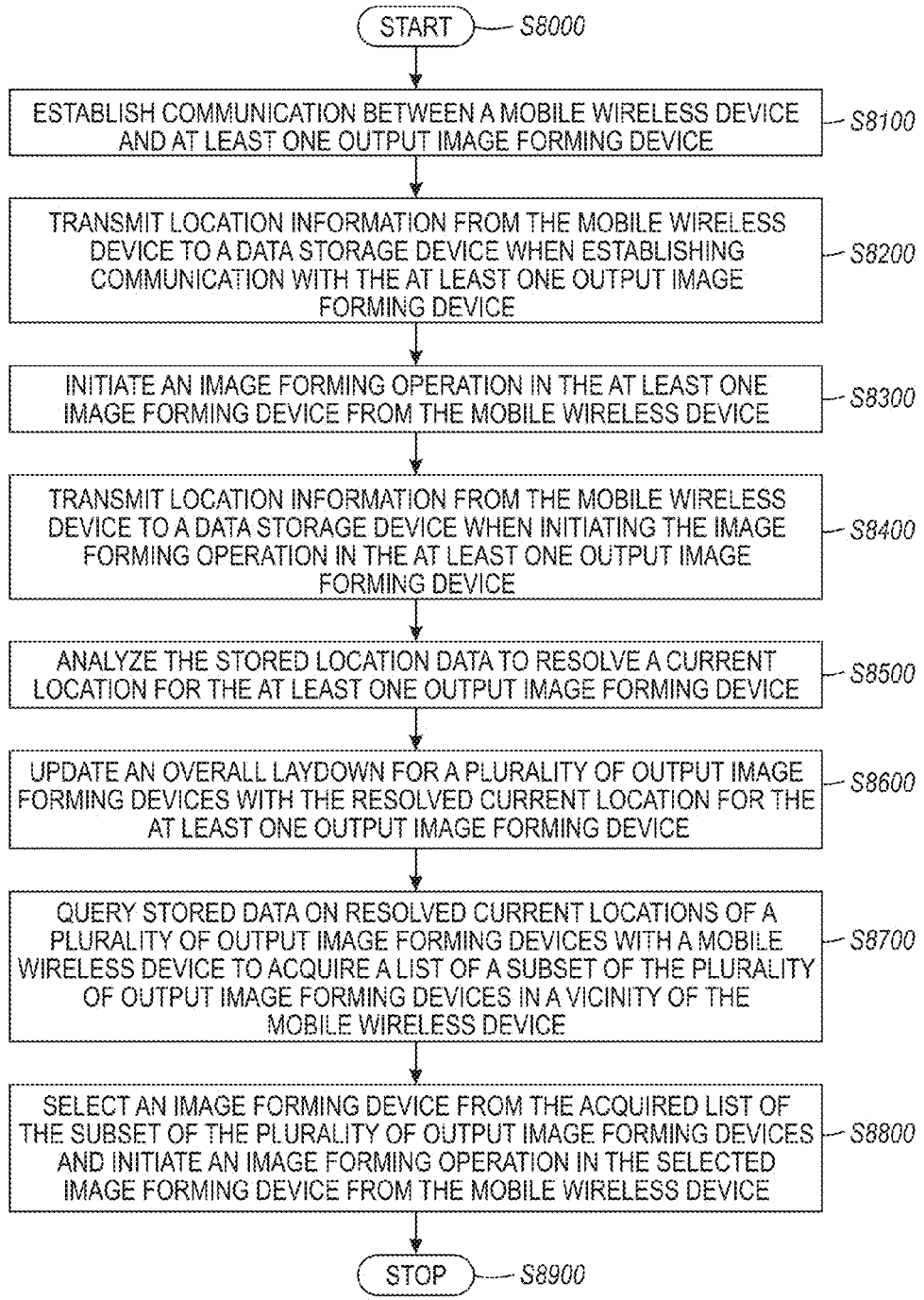
FIG. 8 illustrates a flowchart of an exemplary method for implementing a detection and localization scheme for one or more output image forming devices in an office workspace environment using location reference data from a mobile wireless device according to this disclosure.

FIG. 8 illustrates a flowchart of an exemplary method for implementing a detection and localization scheme for one or more output image forming devices in an office workspace environment using location reference data from a mobile wireless device according to this disclosure. As shown in FIG. 8, operation of the method commences at Step S8000 and proceeds to Step S8100.

In Step S8100, communications may be established between a mobile wireless device and at least one output image forming device. This communication may be initiated, for example, by the mobile wireless device scanning a machine readable code from the body of, or a user interface associated with, the at least one output image forming device. The "scanned" information may include all of the information required to establish the communication link with the at least one output image forming device, or may separately direct the mobile wireless device to stored data located in a data storage device such as a network server or a cloud storage location with which the at least one output image forming device is in wired or wireless communication. Operation of the method proceeds to Step S8200.

In Step S8200, location information for the mobile wireless device may be transmitted to the data storage device when communication is established between the mobile wireless device and the at least one output image forming device. A presumption is that the individual mobile wireless device will be in close proximity to the at least one output image forming device when the communication is established between the devices. The location information for the mobile wireless device may be derived from an internal position reference device in the mobile wireless device in the manner discussed above. Operation of the method proceeds to Step S8300.

In Step S8300, an image forming operation may be initiated from the mobile wireless device to be executed on the at least one image forming device with which the mobile wireless device has established communication. A mobile wireless device print application may provide a user of the mobile wireless device with functionality for directing image forming operations on the at least one output image forming device that is similar to that which would be provided to the user if operating the output image forming device from an integral graphical user interface, or from a connected user workstation. Operation of the method proceeds to Step S8400.

In Step S8400, location information for the mobile wireless device may be transmitted to the data storage device in each instance that an image forming operation is directed from the mobile wireless device to the at least one output image forming device. Location information from a plurality of mobile wireless devices, each directing a number of image forming operations to be performed by a specific at least one output image forming device, may be collected and stored in association with an identification of the at least one output image forming device. A presumption is that users of a plurality of mobile wireless devices will direct image forming operations to output image forming devices located proximately to them, and therefore to the locations of their mobile wireless devices, at the time the image forming operations are initiated to maximize user convenience. Operation of the method proceeds to Step S8500.

In Step S8500, stored location data received from a plurality of mobile wireless devices establishing communications with, or directing image forming operations in, at least one output image forming device may be analyzed to resolve a current location for the at least one output image forming device. The stored location data may be time-stamped to aid the analysis by prioritizing more recent location data over aged location data. The analysis may prioritize the stored location data according to a frequency of image forming operations being directed to the at least one output image forming device by individual ones of the plurality of mobile wireless devices. Such prioritized analysis may partially or completely disregard location information from mobile wireless devices that infrequently initiate image forming operations in the at least one output image forming device, or location information from mobile wireless devices that lie outside a particular radius from an initially-resolved location of the at least one output image forming device. Operation of the method proceeds to Step S8600.

In Step S8600, an initial or overall laydown for a plurality of output image forming devices associated with a particular site may be automatically reviewed and updated as information from the analysis indicates that a position of one or more of the plurality of output image forming devices has changed. Operation of the method proceeds to Step S8700.

In Step S8700, a mobile wireless device may send an inquiry to a data storage device that stores information on current locations of a plurality of output image forming devices at a particular site. In response to the inquiry, a list of a subset of all of the output image forming devices may be obtained, the subset identifying those output image forming devices that are located proximately to a current location of the mobile wireless device. The list may be displayed, for example, on a display device associated with the mobile wireless device. Operation of the method proceeds to Step S8800.

In Step S8800, a user of the mobile wireless device may select an available and proximate output image forming device from the presented list of those output image forming devices that are determined to be in close proximity to the current location of the mobile wireless device and initiate an image forming operation on the selected output image forming device from the mobile wireless device. Operation of the method proceeds to Step S8900, where operation of the method ceases.

The above-described exemplary systems and methods reference certain conventional components to provide a brief, general description of suitable mobile wireless devices, output image forming devices, and wireless and networked operating environments that may be particularly adaptable to the detection and localization schemes according to the systems and methods described. Those skilled in the art will appreciate that other embodiments of the disclosed subject matter may be practiced with many types of wireless communicating devices and output image forming devices using analysis tools in networked environments in many different configurations.

The exemplary depicted sequence of executable instructions described in the above method represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 8, and the accompanying description, except where a particular method step is a necessary precondition to execution of any other method step. Individual method steps may be carried out in sequence or in parallel, in simultaneous or near simultaneous timing, as appropriate.

Although the above description may contain specific details, they should not be construed as limiting the claims in any way. Other configurations of the described embodiments of the disclosed systems and methods are part of the scope of this disclosure.

It will be appreciated that a variety of the above-disclosed and colorably-related features and functions, or alternatives thereof, may be desirably combined into many related different systems or applications. Various alternatives, modifications, variations, or improvements therein may be subsequently made by those skilled in the art which are also intended to be encompassed by the following claims.

What is claimed is:

1. A method for localizing placement of an office device in an operating environment, comprising:
    collecting location data for one or more mobile wireless devices communicating with the office device in the operating environment, the location data being collected at the time of an interactive event between the one or more mobile wireless devices and the office device;
    analyzing, with a processor, the collected location data to resolve a location of the office device; and
    outputting a result of the analysis to an operator for use in tracking locations of a plurality of office devices in the operating environment,
    wherein analyzing comprises analyzing a frequency of interactive events between the one or more mobile wireless devices and the office device, and prioritizing a relevance of the location data for the one or more mobile wireless devices according to the frequency of the interactive events between each of the one or more mobile wireless devices and the office device.

2. The method of claim 1, the location data for each of the one or more mobile wireless devices being based on the each of the one or more mobile wireless devices resolving a location of the each of the one or more mobile wireless devices with reference to one of a (1) Global Positioning Satellite system, (2) cellular telephone network system, and (3) plurality of wireless access points.

3. The method of claim 1, the interactive event comprising the one or more mobile wireless devices scanning a machine readable mark associated with the office device, the machine readable mark providing elements of information for the one or more mobile wireless devices to establish communication with the office device.

4. The method of claim 1, the office device being an output image forming device, and the interactive event comprising the one or more mobile wireless devices initiating an image forming operation in the output image forming device.

5. The method of claim 1, the analysis comprising analyzing a relative distance from a center point of the location data for each location data input and assigning a lower relevance to location data that is more remote from the center point.

6. The method of claim 1, further comprising associating a time of occurrence for each interactive event, the analysis assigning a lower relevance to interactive events that were earlier in time as compared to more recent interactive events according to the associated time of occurrence for each interactive event.

7. The method of claim 6, the plurality of office devices being a plurality of output image forming devices, the method further comprising:
    selecting, with the individual mobile wireless device, one of the output image forming devices from the displayed listing; and
    initiating an image forming operation in the selected one of the output image forming devices.

8. The method of claim 1, further comprising:
    requesting, with an individual mobile wireless device, information from the result of the analysis regarding which of the plurality of office devices is located within a particular distance of a current location of the individual mobile wireless device; and
    receiving a listing, displayed on the individual mobile wireless device, specifying which of the plurality of office devices is located within the particular distance.

9. The method of claim 1, the analysis determines that the office device is relocated in the operating environment, updated collected location data to resolve a new location of the office device, and modifies a result of a previous analysis to include the new location of the office device in the operating environment.

10. A mobile wireless device for localizing placement of an office device in an operating environment, comprising:
    a position reference device by which the mobile wireless device at least one of continuously or periodically updates a location of the mobile wireless device; and
    at least one external communication interface by which the mobile wireless device (1) communicates with at least one office device for conducting an interactive event with the at least one office device and (2) communicates the location of the mobile wireless device at the time of the interactive event to a storage device,
    wherein collected location data for the mobile wireless device stored in the storage device is analyzed to resolve a location of the office device, the analysis comprising analyzing a frequency of interactive events between the mobile wireless device and the office device and prioritizing a relevance of the location data for the mobile wireless device according to the frequency of the interactive events between the mobile wireless device and the office device.

11. The mobile wireless device of claim 10, the position reference device updating the location of the mobile wireless device by referencing one of a (1) Global Positioning Satellite system, (2) cellular telephone network system, and (3) plurality of wireless access points.

12. The mobile wireless device of claim 10, further comprising another external communication interface by which the mobile wireless device scans a machine readable mark associated with the office device as the interactive event, the machine readable mark providing elements of information for the mobile wireless device to establish communication with the office device.

13. The mobile wireless device of claim 10, the office device being an output image forming device, the mobile wireless device further comprising a processor that is programmed to execute a mobile wireless device print application in the output image forming device, the mobile wireless device executing the mobile wireless device print application to initiate an image forming operation in the output image forming device as the interactive event.

14. The mobile wireless device of claim 13, the mobile wireless device print application comprising requesting, with the mobile wireless device, information regarding specific output image forming devices that are located within a particular distance from a current location of the mobile wireless device, and
    the mobile wireless device further comprising a display device that displays a listing of the specific output image forming devices located within the particular distance from the current location of the mobile wireless device, the listing being received in response to the request.

15. The mobile wireless device of claim 14, further comprising a user interface by which a user (1) selects one of the specific output image forming devices from the displayed listing, and (2) initiates an image forming operation in the selected one of the specific output image forming devices as the interactive event.

16. The mobile wireless device of claim 10, the processor being further programmed to associate a time of occurrence for each interactive event, the analysis assigning a lower relevance to interactive events that were earlier in time as compared to more recent interactive events according to the associated time of occurrence for each interactive event.

17. A non-transitory computer-readable medium storing instructions which, when executed by a processor, cause the processor to execute a method for localizing placement of an office device in an operating environment, the method comprising:

collecting location data for one or more mobile wireless devices communicating with the office device in the operating environment, the location data being collected at the time of an interactive event between the one or more mobile wireless devices and the office device;

analyzing, with a processor, the collected location data to resolve a location of the office device; and outputting a result of the analysis to an operator for use in tracking locations of a plurality of office devices in the operating environment, wherein analyzing comprises analyzing a frequency of interactive events between the one or more mobile wireless devices and the office device, and prioritizing a relevance of the location data for the one or more mobile wireless devices according to the frequency of the interactive events between each of the one or more mobile wireless devices and the office device.

18. The non-transitory computer-readable medium of claim 17, the office device being an output image forming device, and the interactive event comprising the one or more mobile wireless devices initiating an image forming operation in the output image forming device.

* * * * *